(12) United States Patent
Tian et al.

(10) Patent No.: US 12,606,691 B2
(45) Date of Patent: Apr. 21, 2026

(54) METHOD OF PREPARING LAYERED HYDROTALCITE-LIKE PVC HEAT STABILIZER FROM VERMICULITE

(71) Applicant: Tarim University, Alar (CN)

(72) Inventors: Weiliang Tian, Alar (CN); Kaidi Zhu, Alar (CN); Lijuan Liu, Alar (CN); Houmei You, Alar (CN); Zhong Li, Alar (CN); Jinpeng Hou, Alar (CN); Yiwen Shen, Alar (CN); Xiangkun Zhang, Alar (CN); Huiping Ding, Alar (CN); Kewei Zhang, Alar (CN); Yongjun Feng, Alar (CN); Yanjun Lin, Alar (CN)

( * ) Notice: Subject to any disclaimer, the term of this patent is extended or adjusted under 35 U.S.C. 154(b) by 516 days.

(21) Appl. No.: 18/326,019

(22) Filed: May 31, 2023

(65) Prior Publication Data

US 2023/0323078 A1     Oct. 12, 2023

(30) Foreign Application Priority Data

Jul. 13, 2022    (CN) .......................... 202210827967.1

(51) Int. Cl.
 C08K 3/34 (2006.01)
 C08K 5/12 (2006.01)
(52) U.S. Cl.
 CPC . C08K 3/34 (2013.01); C08K 5/12 (2013.01)
(58) Field of Classification Search
 CPC ... C08K 3/34; C08K 5/12; C08K 3/36; C08K 3/22; Y02P 20/52; C08L 2201/02; C08L 2201/08
 See application file for complete search history.

(56) References Cited

U.S. PATENT DOCUMENTS

| | | | |
|---|---|---|---|
| 2010/0120959 A1 | 5/2010 | Qin et al. | |
| 2011/0130493 A1 | 6/2011 | Schambony et al. | |
| 2014/0336312 A1 | 11/2014 | Schambony et al. | |

FOREIGN PATENT DOCUMENTS

| | | | | |
|---|---|---|---|---|
| CN | 106589451 B | * | 4/2018 | ............... C08K 3/34 |

* cited by examiner

*Primary Examiner* — Robert S Jones, Jr.
*Assistant Examiner* — Joshua Caleb Bledsoe
(74) *Attorney, Agent, or Firm* — Hemisphere Law, PLLC

(57) ABSTRACT

A method of preparing layered hydrotalcite-like PVC heat stabilizer from vermiculite is disclosed, including the following steps. Vermiculite is pretreated to prepare nano scale vermiculite flakes. Fluoride, ammonia and water are added, and layered powder layered hydrotalcite-like compound and silica product are prepared through a series of reactions such as ultrasonic dispersion, which realizes the preparation of vermiculite functional products, and is applied to PVC products to improve the heat stability of PVC. The disclosure can directly prepare vermiculite base layered powder products, has the function of stripping layered vermiculite, and has the advantages of low reaction temperature and low energy consumption. In addition, the treatment agent fluoride can be recycled and reused, which is suitable for industrial production. The prepared product has the advantages of excellent high temperature resistance, anti-aging performance, flame retardant performance as well as certain infrared and ultraviolet blocking capabilities.

8 Claims, 5 Drawing Sheets

METHOD OF PREPARING LAYERED HYDROTALCITE-LIKE PVC HEAT STABILIZER FROM VERMICULITE

CROSS REFERENCE TO RELATED APPLICATION

This patent application claims the benefit and priority of Chinese Patent Application No. 202210827967.1 filed on Jul. 13, 2022, the disclosure of which is incorporated by reference herein in its entirety as part of the present application.

TECHNICAL FIELD

The present disclosure relates to the technical field of stabilizer preparation, and more specifically, to a method of preparing layered hydrotalcite-like PVC heat stabilizer from vermiculite.

BACKGROUND ART

Vermiculite is one of the non-metallic minerals with good resource prospects and potential advantages in China. It is an important non-metallic mineral and also a magnesium bearing hydroaluminosilicate secondary metamorphic mineral with layered structure. It belongs to layered silicate and is cheap and easy to get. Vermiculite can withstand high temperatures, is a poor conductor of heat, and has good electrical insulation. Expanded vermiculite is easy to absorb water and moisture, and it is easy to be stripped when expanding at high temperature. Vermiculite has good interlayer cation exchange capacity, expansion capacity, adsorption capacity, sound insulation, heat insulation, fire resistance, frost resistance and other characteristics, and its chemical properties are stable, insoluble in water, non-toxic, tasteless and no side effects. In industry, it is mainly used to treat wastewater containing heavy metals and organic cations, prepare antibacterial materials and insulation materials, vermiculite filter aids, purification agents and organic vermiculite, etc.

At present, almost all vermiculite in China is made into expanded vermiculite and then used as building heat insulation materials, with low value. The industrial chain for effective utilization of vermiculite resources has not been established. After predatory exploitation, nearly 90% of raw products are exported to foreign countries at low prices. According to the current reserves and development speed, it is estimated that the mining will be completed in 30 years. According to the statistics of the United States Bureau of Mines, the demand for vermiculite in the world will increase by 2% in the coming years.

However, compared with foreign countries, the development and utilization of vermiculite in China has the following problems.

1) Narrow application scope: vermiculite in China is mainly used in building materials, with a small amount in agriculture, electromechanical, chemical and environmental protection fields. In countries other than China, in addition to the above five industrial fields, vermiculite is also used in mechanical, electronic and metallurgical industries, and the application fields are obviously broad.

2) Few product varieties: the varieties of vermiculite patented products in China are obviously less than those in foreign countries, and there is also a big gap in the field of agricultural building materials and petrochemical industry.

3) Simple processing method: in China, vermiculite is generally used directly after the raw ore is calcined and expanded. Foreign countries often adopt different processing methods for different applications, and their processing technology and methods are relatively advanced, novel and diverse, which correspondingly promote the expansion of their utilization fields and the development of new products.

4) Low utilization rate of fine vermiculite: the application of medium coarse vermiculite in China has a good foundation, but the utilization rate of fine (−0.3 mm) vermiculite is low, causing waste of resources. In view of international technical trade barriers and intellectual property protection, it is difficult to directly introduce advanced vermiculite processing technology from abroad. It is necessary to increase the investment and development of independent intellectual property technology in vermiculite industry to accelerate industrial innovation.

At present, vermiculite is usually treated by acid dissolution method, such as hydrochloric acid, sulfuric acid or nitric acid to dissolve layered oxyhydrogen compounds between vermiculite layers. It is difficult to obtain fine layered powder compounds. To use the hydroxide between layers, it is necessary to crush the edges, and the utilization efficiency is limited. As a result, the hydroxide between vermiculite layers is not effectively utilized. After dissolution, there is a lot of waste liquid, and the obtained product contains iron and has color, which severely limits its application range.

From the perspective of sustainable development, it is necessary to strengthen the research on the deep processing technology and application technology of vermiculite, prepare new functional materials, and obtain new vermiculite products with higher added value. Vermiculite is a kind of layered material, mainly composed of silicon oxide tetrahedron and aluminum oxide octahedron. How to effectively disassemble them is the key to improve the utilization rate of vermiculite. However, in fact, when one layer is destroyed, another layer is also destroyed. Therefore, it is one of the key problems to expand the application of vermiculite that how to effectively remove one layer and keep other layers unaffected.

SUMMARY

In view of the above, the present disclosure provides a method of preparing layered hydrotalcite-like PVC heat stabilizer from vermiculite. The disclosure adopts the fluorination method to prepare layered oxyhydrogen compound, which has simple process, easy popularization and obvious economic value.

In order to achieve the above purpose, technical solutions of the present disclosure are specifically described as follows.

The method of preparing layered hydrotalcite-like PVC heat stabilizer from vermiculite includes the following steps.

(1) The vermiculite is pretreated to obtain expanded vermiculite, and impurities in the expanded vermiculite are removed after washing with water.

(2) Shearing ultrasonic and fine grinding is performed on the expanded vermiculite in step (1) to obtain nano sized vermiculite flake colloidal solution, then fluoride is added. And a mixture of powder layered hydrotalcite-like and liquid fluorosilicate is obtained by reaction under microwave assisted heating and ultrasonic stirring.

(3) The mixture obtained in step (2) is filtered to obtain a solid layered powder layered hydrotalcite-like compound and a liquid fluorosilicate solution, and spray drying is performed on the solid layered powder layered hydrotalcite-like compound to obtain a layered hydrotalcite-like compound.

(4) Ammonia water or gaseous ammonia is added into the liquid fluorosilicate solution filtered in step (3) to generate fluoride and white colloidal precipitate through reaction. Then they are filtered to obtain a filtered solid and filtrate liquid. The filtered solid is washed and dispersed in water. Then spray drying is performed to obtain silica powder, and the filtrate liquid is left for standby.

(5) The filtrate liquid in step (4) is concentrated under negative pressure to obtain a fluoride for recycling in step (2).

(6) The layered hydrotalcite-like compound in step (3) or the silica in step (4) is added to acetone solution. After ultrasonic assisted centrifugal washing 3-5 times, acetone solution is added, and ultrasonic assisted dispersion is performed. Then PVC powder is added and ultrasonic assisted dispersion is performed again to obtain a homogeneous suspension.

(7) The homogeneous suspension in step (6) is centrifuged at 1000-30000 r/min to obtain layered hydrotalcite-like compound and PVC mixture or silica and PVC mixture. After drying at 20-300° C. for 2-30 hours, a uniform heat stabilizer and a PVC solid mixture are obtained.

(8) A plasticizer is added into the heat stabilizer and the PVC solid mixture in step (7), and then PVC products are obtained after heating and plasticizing.

Further, the method for pretreating vermiculite in step (1) is that the vermiculite is rapidly expanded for 5-10 min at 800-1000° C. to obtain an expanded vermiculite of intermediate interstitial.

The beneficial effects of the above technical solutions are as follows. The expanded vermiculite is prepared at 800-1000° C. to obtain a porous intermediate, which is conducive to further stripping, removing impurities such as soil dust, and preparing pure vermiculite functional products.

Further, the shearing ultrasonic and fine grinding in step (2) is performed alternately by shearing ultrasonic and fine grinding. The grinding particle size in step (2) is 0.05-2.5 mm.

The fluoride in step (2) is ammonium fluoride, ammonium bifluoride or hydrogen fluoride.

The mass ratio of the fluoride to vermiculite is 1-20:1.

The reaction temperature of the fluoride and expanded vermiculite is 1-230° C., and the reaction time is 0.1-48 h in step (2).

The beneficial effects of the above technical solutions are as follows. Through the reaction of fluoride and vermiculite, the material structure of expanded vermiculite is improved, and the vermiculite in the disclosure is changed into a layered structure through the fixed proportion effect. Under the premise of low temperature and low energy consumption, the reaction rate is maximized, resources are saved, and the reaction efficiency is improved.

Further, the drying temperature in step (3) is 60-120° C., and the drying time is 8-48 h.

Further, the concentration of the ammonia water in step (4) is 0.1%-28%, and the reaction temperature is −10° C.-200° C.

The beneficial effects of the above technical solutions are as follows. Fluoride silicate reacts with ammonia water to obtain fluoride, realizing the recycling of raw materials and reducing pollution emissions.

Further, in step (5), the concentration temperature of the fluoride is 30-60° C., and the vacuum degree of the negative pressure is 0.001-0.5 MPa.

The beneficial effects of the above technical solutions are as follows. The fluoride solution is concentrated at 30-60° C., and the vacuum degree of 0.001~0.5 MPa is used, which can reduce the volatilization of fluoride, reduce the air pollution, and concentrate the solution to the maximum extent.

Further, in step (6), the mass ratio of the layered hydrotalcite-like compound to PVC is 1-30:100, the mass ratio of silica to PVC is 1-30:100, the centrifugation speed is 1000-5000 r/min, and the ultrasonic frequency is 1-50 KHz.

Further, in step (8), the plasticizer is dioctyl phthalate.

The mass ratio of the addition amount of the plasticizer to the PVC is 1:0.8-1.2.

The plasticizing temperature is 150-200° C., and the plasticizing time is 1-30 min.

The experimental results show that white layered magnesium aluminum hydroxide (hydrotalcite) and silica can be prepared by decomposing vermiculite with ammonium fluoride. It can be seen from FIG. 2 that there are characteristic peaks of 003 and 006 layered hydrotalcite (LDHs) on the layered hydrotalcite-like compound, mainly MgAl-LDHs. It proves that the method is feasible to strip the vermiculite.

Compared with the prior art, the product obtained by the method of preparing layered hydrotalcite-like PVC heat stabilizer from vermiculite disclosed in the disclosure can achieve the following technical effects.

1) By removing the silica tetrahedron of vermiculite laminates, the disclosure prepares layered hydrotalcite-like powder, and simultaneously obtains the by-product silica, which realizes the separation of silica octahedron and aluminum oxide tetrahedron structures of vermiculite, and realizes the coupling of reaction and separation.

2) The method of the disclosure has the function of stripping layered vermiculite.

3) The disclosure can directly prepare vermiculite base layered hydrotalcite-like functional products.

4) The reaction of the disclosure can be carried out at low temperature and has the advantage of low energy consumption.

5) The treating agent fluoride used in the disclosure can be recycled to realize the green production concept.

6) The preparation process of the disclosure is simple and realizes the preparation of vermiculite layered hydrotalcite-like powder, which has no color, has wide application range, and is suitable for industrial production.

7) The product prepared by the disclosure can be directly mixed with PVC, avoiding problems such as agglomeration caused by drying of powder equipment.

The equations of the present reaction principle in the disclosure are as follows.

$$\text{Reaction 1: } 6NH_4F + SiO_2 \rightarrow (NH_4)_2SiF_6 + 4NH_3\uparrow + 2H_2O\uparrow \tag{1}$$

$$\text{Reaction 2: } (NH_4)_2SiF_6 + 4NH_3 + (n+2)H_2O \rightarrow 6NH_4F + SiO_2 \cdot nH_2O\downarrow \tag{2}$$

Overall reaction: $SiO_2 + (n+2)$
$$H_2O \rightarrow SiO_2 \cdot nH_2O \downarrow 2H_2O \uparrow \qquad (3)$$

DETAILED DESCRIPTION OF THE EMBODIMENTS

Figure 1:
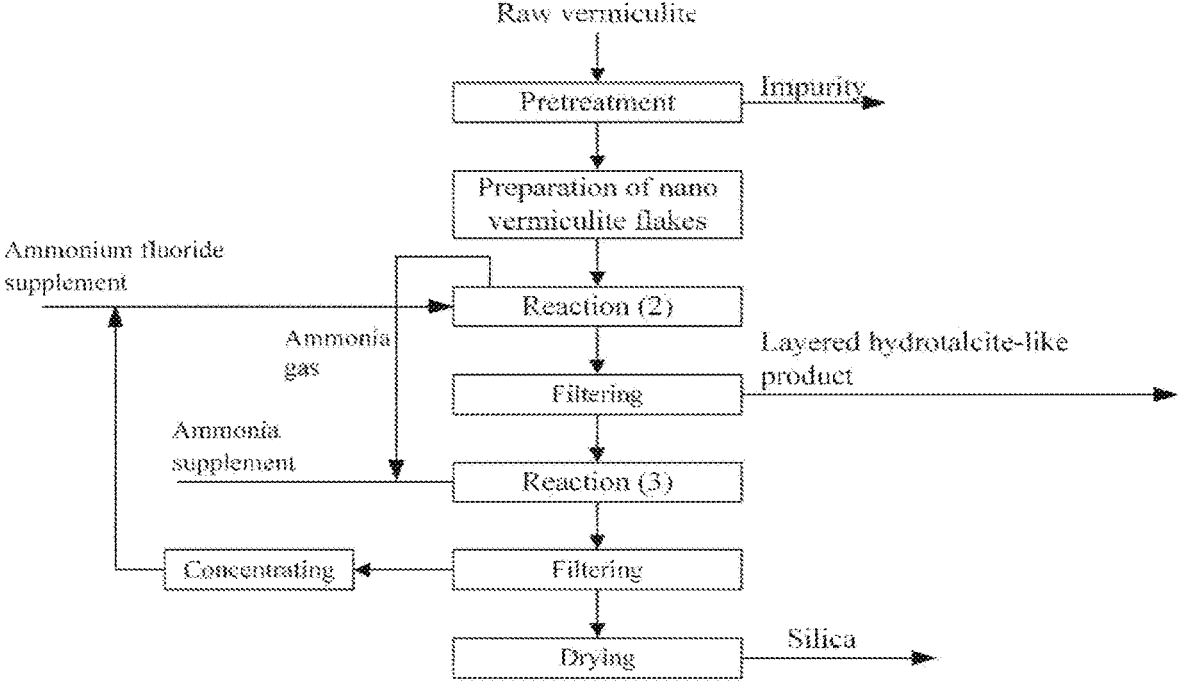
FIG. 1 is the process flow diagram of the present disclosure.
Figure 2:
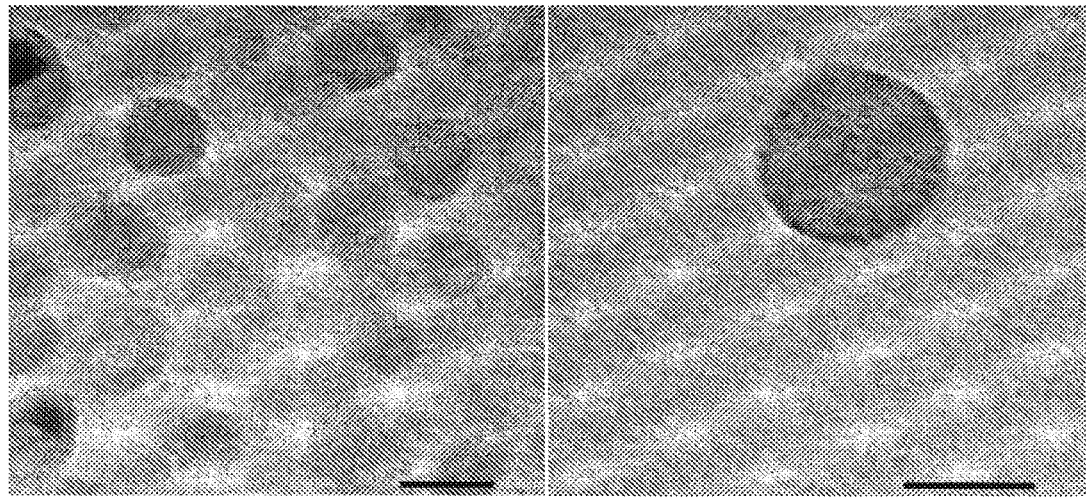
FIG. 2 is the XRD diagram of the vermiculite, the prepared layered hydrotalcite-like compound and the silica product of the present disclosure.
Figure 3:
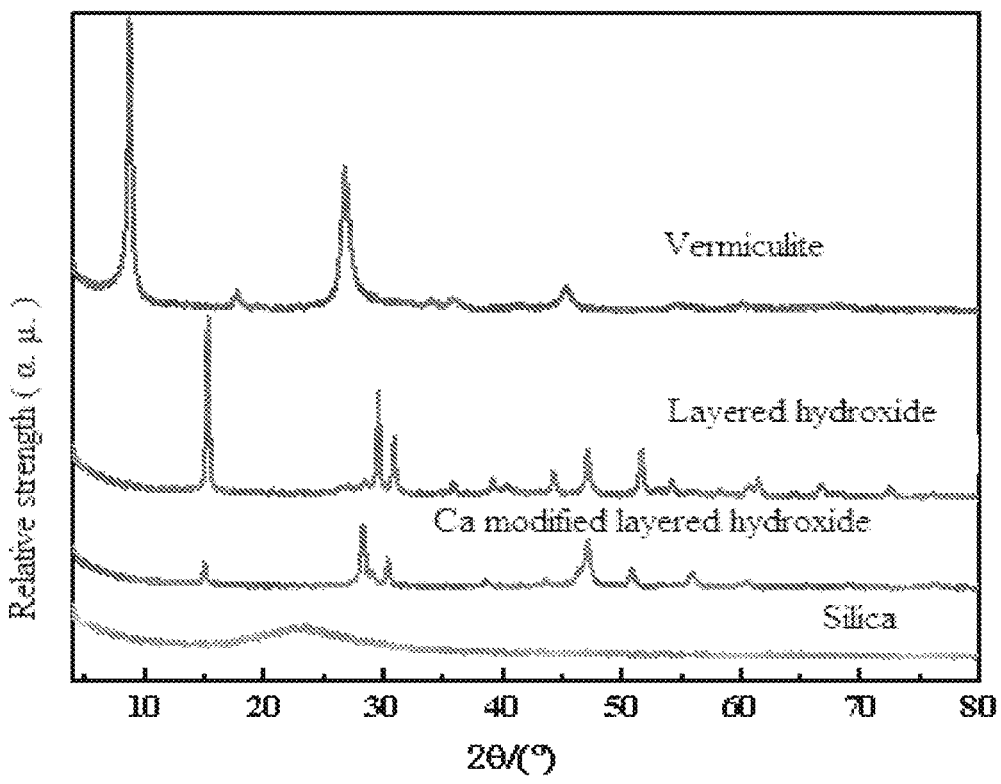
FIG. 3 shows the comparison of relative strength of different types of PVC heat stabilizers.
Figure 4:
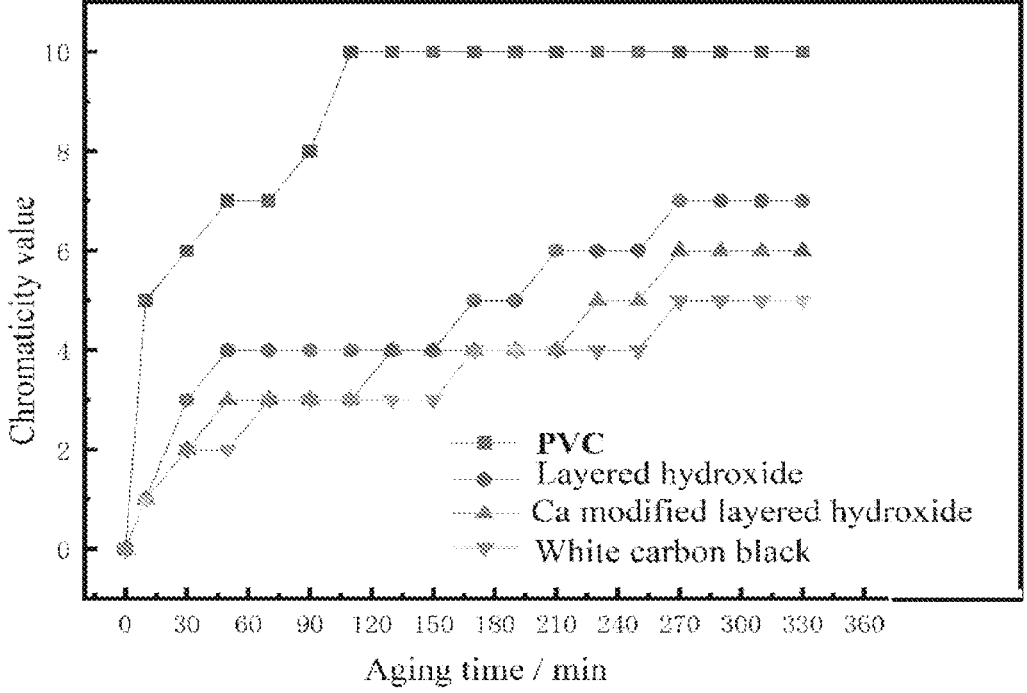
FIG. 4 shows the comparison of chromaticity value of different types of PVC heat stabilizers.
Figure 5:
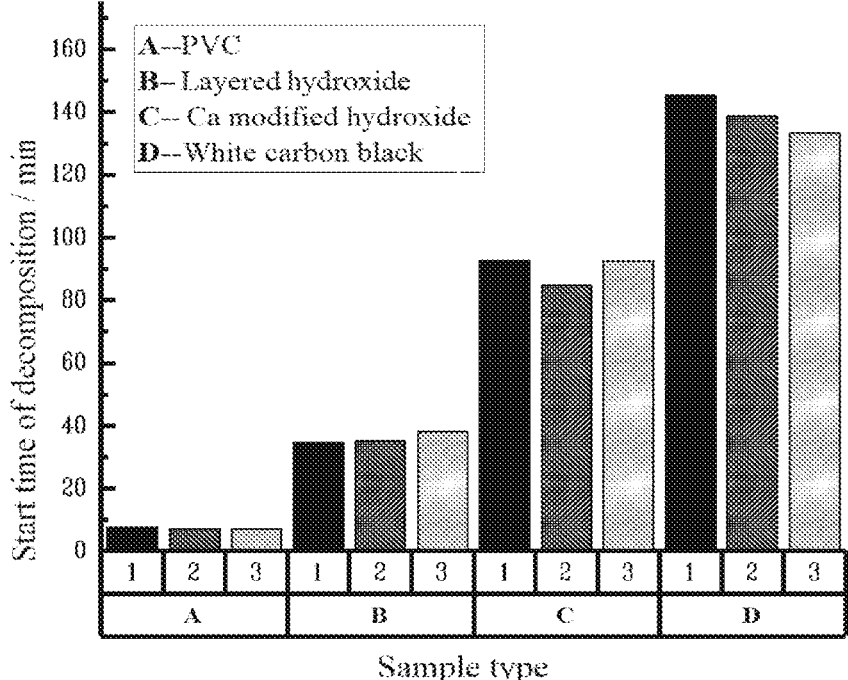
FIG. 5 shows the comparison of the start time of decomposition of different types of PVC heat stabilizers.

Technical solutions of the present disclosure will be clearly and completely described below with reference to the embodiments. Obviously, the described embodiments are only part of the embodiments of the present disclosure, not all of them. Based on the embodiments of the disclosure, all other embodiments made by those skilled in the art without sparing any creative effort should fall within the protection scope of the disclosure.

Embodiment 1

(1) The vermiculite was rapidly expanded at 800° C. for 5 min to obtain expanded vermiculite. After water washing and flotation, impurities (mica, sand, soil and other impurities) of the expanded vermiculite were removed. After drying, shear ultrasonic and fine grinding were performed alternately, once every 30 minutes. The particle size of zirconia pellets used for fine grinding was 0.1-0.2 mm, 0.2-0.4 mm, 0.4-0.6 mm, 0.6-0.8 mm, 0.8-1.0 mm, accounting for 20% respectively, to prepare vermiculite flake colloid of about 300 nm.

(2) 50 g nano vermiculite flake colloid prepared in step (1) was taken and 30 g ammonium fluoride was added. Then the solution mixture of layered hydrotalcite-like compound and fluosilicate was obtained by reaction under microwave assisted heating and ultrasonic stirring at 100° C. for 1 h.

(3) The solution mixture of layered hydrotalcite-like compound and fluorosilicate obtained in step (2) was filtered to obtain solid layered hydrotalcite-like compound, and the layered hydrotalcite-like product was obtained by drying for 8 h at 60° C. under vacuum.

(4) Ammonia water with a concentration of 5% was added to the liquid containing fluosilicate filtered in step (3), and the mass ratio of fluosilicate to ammonia water was 0.5:1. The reaction generated ammonium fluoride and white colloidal precipitation at room temperature. After filtering, the silica product was obtained by drying at 80° C. for 2 h.

(5) The ammonium fluoride liquid in step (4) was concentrated under the temperature of 60° C. and the vacuum degree of 0.5 MPa, and then recycled for use.

(6) The layered hydrotalcite-like compound in step (3) and the silica in step (4) were respectively added to the ethanol solution. After stirring and ultrasonic assisted centrifugal washing for 3 times at the speed of 5000 r/min, the ethanol solution was added. And the ultrasonic assisted dispersion was conducted at the frequency of 1 kHz. The mass ratio of the layered hydrotalcite-like product or silica to PVC was 6:100, and the ultrasonic assisted dispersion was conducted again to obtain a homogeneous suspension.

(7) The homogeneous suspension in step (6) was centrifuged at a speed of 5000 r/min to obtain silica heat stabilizer, solid layered hydrotalcite-like compound and PVC mixture. After drying at 20° C. for 30 h, a uniform silica heat stabilizer or solid layered hydrotalcite-like compound and PVC solid mixture were obtained.

(8) Dimethyl phthalate was added into the heat stabilizer and PVC solid mixture in step (7). The mass ratio of the addition amount of dimethyl phthalate to PVC was 1:0.8. And the PVC product was prepared by heating and plasticizing at 185° C. for 5 min.

In addition to the heat stability, the prepared PVC product had the flame retardancy and certain infrared and ultraviolet blocking capabilities.

Embodiment 2

(1) The vermiculite was rapidly expanded at 1000° C. for 5 min to obtain expanded vermiculite. After water washing and flotation, impurities (mica, sand, soil and other impurities) of the expanded vermiculite were removed. After drying, shear ultrasonic and fine grinding were performed to prepare vermiculite flake colloid of about 400 nm.

(2) 50 g nano vermiculite flake colloid prepared in step (1) was taken and 100 g ammonium fluoride was added. Then the solution mixture of layered hydrotalcite-like compound and fluosilicate was obtained by reaction at 120° C. for 1.2 h.

(3) The solution mixture of layered hydrotalcite-like compound and fluorosilicate obtained in step (2) was filtered to obtain solid layered hydrotalcite-like product. Then the calcium chloride solution was added. After stirring for modification for 12 h, the layered hydrotalcite-like product was obtained by drying at 120° C. for 8 h.

(4) Ammonia water with a concentration of 0.1% was added to the liquid containing fluosilicate filtered in step (3), and the mass ratio of fluosilicate to ammonia water was 0.5:1. The reaction generated ammonium bifluoride and white colloidal precipitation at the temperature of 20° C. After filtering, the silica product was obtained by drying at 300° C. for 2 h.

(5) The ammonium bifluoride liquid in step (4) was concentrated under the temperature of 60° C. and the vacuum degree of 0.001 MPa, and then recycled for use.

(6) The layered hydrotalcite-like compound in step (3) and the silica product in step (4) were respectively added to the ethanol solution. After stirring and ultrasonic assisted centrifugal washing for 5 times at the speed of 1000 r/min, the ethanol solution was added. And the ultrasonic assisted dispersion was conducted at the frequency of 50 kHz. The mass ratio of the layered hydrotalcite-like product or silica to PVC was 1:100, and the ultrasonic assisted dispersion was conducted again to obtain a homogeneous suspension.

(7) The homogeneous suspension in step (6) was centrifuged at a speed of 5000 r/min to obtain silica heat stabilizer, solid layered hydrotalcite-like compound and PVC mixture. After drying at 20° C. for 30 h, a uniform silica heat stabilizer or solid layered hydrotalcite-like compound and PVC solid mixture were obtained.

(8) Dimethyl phthalate was added into the heat stabilizer and PVC solid mixture in step (7). The mass ratio of the addition amount of dimethyl phthalate to PVC was 1:0.8. And the PVC product was prepared by heating and plasticizing at 200° C. for 1 min.

In addition to the heat stability, the prepared PVC product had the flame retardancy and certain infrared and ultraviolet blocking capabilities.

Embodiment 3

Preparation of Layered Hydrotalcite-Like PVC Heat Stabilizer from Vermiculite (1) The vermiculite was rapidly expanded at 800° C. for 10 min to obtain expanded vermiculite. After water washing and flotation, impurities (mica, sand, soil and other impurities) of the expanded vermiculite were removed. After drying, shear ultrasonic and fine grinding were performed to prepare vermiculite flake colloid of about 450 nm.

(2) 50 g nano vermiculite flake colloid prepared in step (1) was taken and 30 g ammonium fluoride was added. Then the solution mixture of layered hydrotalcite-like compound and fluosilicate was obtained by reaction under at 120° C. for 0.75 h;

(3) The solution mixture of layered hydrotalcite-like compound and fluorosilicate obtained in step (2) was filtered to obtain solid layered hydrotalcite-like compound. Then the oleic acid solution was added. After stirring for modification for 24 h, the layered hydrotalcite-like product was obtained under vacuum by drying at 60° C. for 24 h.

(4) Ammonia water with a concentration of 10% was added to the liquid containing fluosilicate filtered in step (3), and the mass ratio of fluosilicate to ammonia water was 0.8:1. The reaction generated fluoride and white colloidal precipitation at 0° C. After filtering, the silica product was obtained by drying at 70° C. for 24 h.

(5) The ammonium fluoride liquid in step (4) was concentrated under the temperature of 60° C. and the vacuum degree of 0.5 MPa, and then recycled for use.

(6) The layered hydrotalcite-like compound in step (3) and the silica product in step (4) were respectively added to the ethanol solution. After stirring and ultrasonic assisted centrifugal washing for 3 times at the speed of 5000 r/min, the ethanol solution was added. And the ultrasonic assisted dispersion was conducted at the frequency of 1 kHz. The mass ratio of the layered hydrotalcite-like product or silica to PVC was 30:100, and the ultrasonic assisted dispersion was conducted again to obtain a homogeneous suspension.

(7) The homogeneous suspension in step (6) was centrifuged at a speed of 1000 r/min to obtain silica heat stabilizer, solid layered hydrotalcite-like compound and PVC mixture. After drying at 150° C. for 2 h, a uniform silica heat stabilizer or solid layered hydrotalcite-like compound and PVC solid mixture were obtained.

(8) Dimethyl phthalate was added into the heat stabilizer and PVC solid mixture in step (7). The mass ratio of the addition amount of dimethyl phthalate to PVC was 1:1.2. And the PVC product was prepared by heating and plasticizing at 180° C. for 30 min.

In addition to the heat stability, the prepared PVC product had the flame retardancy and certain infrared and ultraviolet blocking capabilities.

Embodiment 4

Preparation of Layered Hydrotalcite-Like PVC Heat Stabilizer from Vermiculite (1) The vermiculite was rapidly expanded at 900° C. for 7 min to obtain expanded vermiculite. After water washing and flotation, impurities (mica, sand, soil and other impurities) of the expanded vermiculite were removed. After drying, shear ultrasonic and fine grinding were performed to prepare vermiculite flake colloid of about 500 nm.

(2) 50 g nano vermiculite flake colloid prepared in step (1) was taken and 70 g ammonium fluoride was added. Then the solution mixture of layered hydrotalcite-like compound and fluosilicate was obtained by reaction under at 120° C. for 1.5 h.

(3) The solution mixture of layered hydrotalcite-like compound and fluorosilicate obtained in step (2) was filtered to obtain solid layered hydrotalcite-like compound. Then the solid layered hydrotalcite-like compound was added into oleic acid solution for modification for 12 h. After the calcium chloride solution was added, it was stirred for modification for 12 h. Then the layered hydrotalcite-like product was obtained under vacuum by drying at 90° C. for 20 h.

(4) Ammonia water with a concentration of 5% was added to the liquid containing fluosilicate filtered in step (3), and the mass ratio of fluosilicate to ammonia water was 0.6:1. The reaction generated fluoride and white colloidal precipitation at 10° C. After filtering, the silica product was obtained by drying at 150° C. for 15 h.

(5) The ammonium fluoride liquid in step (4) was concentrated under the temperature of 45° C. and the vacuum degree of 0.25 MPa, and then recycled for use.

(6) The layered hydrotalcite-like compound in step (3) and the silica product in step (4) were respectively added to the ethanol solution. After stirring and ultrasonic assisted centrifugal washing for 4 times at the speed of 3000 r/min, the ethanol solution was added. And the ultrasonic assisted dispersion was conducted at the frequency of 20 kHz. The mass ratio of the layered hydrotalcite-like product or silica to PVC was 12:100, and the ultrasonic assisted dispersion was conducted again to obtain a homogeneous suspension.

(7) The homogeneous suspension in step (6) was centrifuged at a speed of 3600 r/min to obtain silica heat stabilizer, solid layered hydrotalcite-like compound and PVC mixture. After drying at 180° C. for 25 h, a uniform silica heat stabilizer or solid layered hydrotalcite-like compound and PVC solid mixture were obtained.

(8) Dimethyl phthalate was added into the heat stabilizer and PVC solid mixture in step (7). The mass ratio of the addition amount of dimethyl phthalate to PVC was 1:1. And the PVC product was prepared by heating and plasticizing at 180° C. for 15 min.

In addition to the heat stability, the prepared PVC product had the flame retardancy and certain infrared and ultraviolet blocking capabilities.

Embodiment 5

Preparation of Layered Hydrotalcite-Like PVC Heat Stabilizer from Vermiculite (1) The vermiculite was rapidly expanded at 850° C. for 8 min to obtain expanded vermiculite. After water washing and flotation, impurities (mica, sand, soil and other impurities) of the expanded vermiculite were removed. After drying, shear ultrasonic and fine grinding were performed to prepare vermiculite flake colloid of about 600 nm.

(2) 50 g nano vermiculite flake colloid prepared in step (1) was taken and 85 g ammonium fluoride was added. Then the solution mixture of layered hydrotalcite-like compound and fluosilicate was obtained by reaction under at 110° C. for 1.8 h.

(3) The solution mixture of layered hydrotalcite-like compound and fluorosilicate obtained in step (2) was filtered to obtain solid layered hydrotalcite-like compound. Then the solid layered hydrotalcite-like compound was added into stearic acid for modification for 12 h. After the calcium chloride solution was added, it was stirred for modification for 12 h. Then the layered hydrotalcite-like product was obtained by drying at 130° C. for 24 h.

(4) Ammonia water with a concentration of 15% was added to the liquid containing fluosilicate filtered in step (3), and the mass ratio of fluosilicate to ammonia water was 0.6:1. The reaction generated fluoride and white colloidal precipitation at 5° C. After filtering, the silica product was obtained by drying at 160° C. for 15 h.

(5) The ammonium fluoride liquid in step (4) was concentrated under the temperature of 50° C. and the vacuum degree of 0.3 MPa, and then recycled for use.

(6) The layered hydrotalcite-like compound in step (3) and the silica product in step (4) were respectively added to the ethanol solution. After stirring and ultrasonic assisted centrifugal washing for 3 times at the speed of 4200 r/min, the ethanol solution was added. And the ultrasonic assisted dispersion was conducted at the frequency of 36 kHz. The mass ratio of the layered hydrotalcite-like product or silica to PVC was 24:100, and the ultrasonic assisted dispersion was conducted again to obtain a homogeneous suspension.

(7) The homogeneous suspension in step (6) was centrifuged at a speed of 1500 r/min to obtain silica heat stabilizer, solid layered hydrotalcite-like compound and PVC mixture. After drying at 230° C. for 16 h, a uniform silica heat stabilizer or solid layered hydrotalcite-like compound and PVC solid mixture were obtained.

(8) Dimethyl phthalate was added into the heat stabilizer and PVC solid mixture in step (7). The mass ratio of the addition amount of dimethyl phthalate to PVC was 1:1.1. And the PVC product was prepared by heating and plasticizing at 180° C. for 5 min.

In addition to the heat stability, the prepared PVC product had the flame retardancy and certain infrared and ultraviolet blocking capabilities.

Test Example

The prepared PVC samples from embodiments 1-5 were put into a 180° C. heat aging oven for static heat aging test, and were taken every 10 min. According to GB/T 2913-1982 standard, the whiteness of PVC test pieces was tested, and a control group experiment was set up.

| Anti-aging time (min) | Layered hydrotalcite-like PVC test piece (330 min) | Silica heat stabilizer PVC test piece (330 min) |
|---|---|---|
| Embodiment 1 | 230 | 182 |
| Embodiment 2 | 220 | 168 |
| Embodiment 3 | 215 | 172 |
| Embodiment 4 | 224 | 159 |
| Embodiment 5 | 222 | 164 |
| Control group (No heat stabilizer) (330 min) | 90 | |

The above experimental data prove that the PVC test pieces containing layered hydrotalcite-like or silica heat stabilizer in the embodiments of the disclosure can be kept for 220 minutes without aging. However, the PVC test pieces in the control group without heat stabilizer has aged in 110 minutes. The disclosure proves that the PVC product has excellent high temperature resistance and aging resistance.

What is claimed is:

1. A method of preparing layered hydrotalcite-like PVC heat stabilizer from vermiculite, comprising the following steps:

(1) pretreating vermiculite to obtain expanded vermiculite, and removing impurities in the expanded vermiculite after washing with water;

(2) performing shearing ultrasonic and fine grinding on the expanded vermiculite in step (1) to obtain nano sized vermiculite flake colloidal solution, then adding fluoride, and obtaining a mixture of powder layered hydrotalcite-like compound and liquid fluorosilicate by reaction under microwave assisted heating and ultrasonic stirring;

(3) filtering the mixture obtained in step (2) to obtain a solid layered powder layered hydrotalcite-like compound and a liquid fluorosilicate solution, and performing spray drying on the solid layered powder layered hydrotalcite-like compound to obtain a layered hydrotalcite-like compound;

(4) adding ammonia water or gaseous ammonia into the liquid fluorosilicate solution filtered in step (3), generating fluoride and white colloidal precipitate through reaction, filtering to obtain a filtered solid and a filtrate liquid, washing the filtered solid and dispersing it in water, then performing spray drying to obtain silica powder, and leaving the filtrate liquid for standby;

(5) concentrating the filtrate liquid in step (4) under negative pressure to obtain a fluoride for recycling in step (2);

(6) adding the layered hydrotalcite-like compound in step (3) or the silica in step (4) to acetone solution, performing ultrasonic assisted centrifugal washing 3-5 times, adding acetone solution, and then performing ultrasonic assisted dispersion, adding PVC powder and performing ultrasonic assisted dispersion again to obtain a homogeneous suspension;

(7) centrifuging the homogeneous suspension in step (6) at 1000-30000 r/min to obtain layered hydrotalcite-like compound and PVC mixture or silica and PVC mixture, drying at 20-300° C. for 2-30 hours, and obtaining a uniform heat stabilizer and a PVC solid mixture; and (8) adding a plasticizer into the heat stabilizer and the PVC solid mixture in step (7), then heating and plasticizing to obtain PVC products.

2. The method of preparing layered hydrotalcite-like PVC heat stabilizer from vermiculite of claim 1, wherein a method for pretreating vermiculite in step (1) is: rapidly expanding for 5-10 min at 800-1000° C. to obtain an expanded vermiculite of porous intermediate.

3. The method of preparing layered hydrotalcite-like PVC heat stabilizer from vermiculite of claim 1, wherein the shearing ultrasonic and fine grinding in step (2) is performed alternately by shearing ultrasonic and fine grinding; a grinding particle size in step (2) is 0.05-2.5 mm;

the fluoride in step (2) is ammonium fluoride, ammonium bifluoride or hydrogen fluoride;

a mass ratio of the fluoride to vermiculite is 1-20:1;

a reaction temperature of the fluoride and expanded vermiculite is 1° C.-230° C., and a reaction time is 0.1-48 h in step (2).

4. The method of preparing layered hydrotalcite-like PVC heat stabilizer from vermiculite of claim 1, wherein a drying temperature in step (3) is 60-120° C., and a drying time is 8-48 h.

5. The method of preparing layered hydrotalcite-like PVC heat stabilizer from vermiculite of claim 1, wherein a concentration of the ammonia water in step (4) is 0.1%-28%; a reaction temperature is −10° C.-200° C.

6. The method of preparing layered hydrotalcite-like PVC heat stabilizer from vermiculite of claim 1, wherein in step (5), a concentration temperature of the fluoride is 30-60° C., and a vacuum degree of the negative pressure is 0.001-0.5 MPa.

7. The method of preparing layered hydrotalcite-like PVC heat stabilizer from vermiculite of claim 1, wherein in step (6), a mass ratio of the layered hydrotalcite-like compound and PVC is 1-30:100, a mass ratio of silica to PVC is 1-30:100, a centrifugation speed is 1000-5000 r/min, and an ultrasonic frequency is 1-50 kHz.

8. The method of preparing layered hydrotalcite-like PVC heat stabilizer from vermiculite of claim 1, wherein in step (8), the plasticizer is dioctyl phthalate;

a mass ratio of the addition amount of the plasticizer to the PVC is 1:0.8-1.2;

a plasticizing temperature is 150-200° C., and a plasticizing time is 1-30 min.

\* \* \* \* \*